United States Patent
Siegel et al.

(10) Patent No.: US 6,266,336 B1
(45) Date of Patent: Jul. 24, 2001

(54) APPARATUS AND METHOD FOR SETTING A/C BITS IN TOKEN RING FRAMES FOR SWITCHES

(75) Inventors: Michael Steven Siegel, Raleigh; Max Robert Povse, Apex, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/025,715

(22) Filed: Feb. 18, 1998

(51) Int. Cl.⁷ .................................................. H04L 12/46
(52) U.S. Cl. .............................. 370/405; 370/401
(58) Field of Search .................. 370/351, 352, 370/401, 402, 403, 404, 405, 406, 409, 410, 471, 475, 476; 711/202, 206, 216, 221

(56) References Cited

U.S. PATENT DOCUMENTS

| | | | |
|---|---|---|---|
| 4,665,517 | 5/1987 | Widmer | 370/86 |
| 4,979,167 | * 12/1990 | McCool | 370/453 |
| 5,079,764 | 1/1992 | Orita et al. | 370/85.13 |
| 5,251,213 | * 10/1993 | Videlock et al. | 370/403 |
| 5,319,644 | 6/1994 | Liang | 370/85.5 |
| 5,327,431 | 7/1994 | Heske, III et al. | 370/85.5 |
| 5,329,527 | 7/1994 | Ujihashi et al. | 370/85.13 |
| 5,343,471 | 8/1994 | Cassagnol | 370/85.13 |
| 5,351,242 | 9/1994 | Kramarczyk et al. | 370/85.5 |
| 5,390,173 | * 2/1995 | Spinney et al. | 370/401 |
| 5,396,493 | * 3/1995 | Sugiyama | 370/403 |
| 5,444,692 | * 8/1995 | Basso et al. | 370/222 |
| 5,539,727 | 7/1996 | Kramarczyk et al. | 370/16.1 |
| 5,724,350 | * 3/1998 | Hamada et al. | 370/392 |
| 5,910,955 | * 6/1999 | Nishimura et al. | 370/401 |
| 5,982,762 | * 11/1999 | Anzai et al. | 370/401 |
| 5,999,530 | * 12/1999 | LeMaire et al. | 370/401 |
| 5,999,536 | * 12/1999 | Kawafuji et al. | 370/401 |

\* cited by examiner

*Primary Examiner*—Douglas Olms
*Assistant Examiner*—Ken Vanderpuye
(74) *Attorney, Agent, or Firm*—Joscelyn G. Cockburn

(57) ABSTRACT

An apparatus for use in token ring switches for selectively setting the A/C bits in token ring frames. The apparatus includes a database with addresses of stations on the ring connected to the port. The apparatus compares the destination addresses of frames received from the ring with the addresses in the database and sets the A/C bits only if a match does not occur. By setting the A/C bits selectively, by the port, errors that would otherwise occur, either by setting the A/C bits on all frames or not setting the bits on all frames, are obviated.

19 Claims, 12 Drawing Sheets

ACF RAM RECORD FORMAT

US 6,266,336 B1

APPARATUS AND METHOD FOR SETTING A/C BITS IN TOKEN RING FRAMES FOR SWITCHES

BACKGROUND OF THE INVENTION

1. Field of the Invention

The present invention relates to communication networks in general and in particular to communication networks comprising of one or more switches interconnecting Local Area Networks (LANs).

2. Prior Art

The use of switches for interconnecting LANs are well known in the prior art. A conventional switch includes at least two ports coupled through one or more frame processing modules to a switch fabric. The switch fabric provides the interconnection between the ports. Each port is connected to a LAN segment that has a shared transmission medium to which a plurality of stations are connected. Even though the stations co-habitate on shared media, when stations on different ports are communicating, the transmission is point-to-point. As a consequence, the switch provides more bandwidth for stations communicating from different LAN segments.

Even though the switch provides more bandwidth to stations, it presents unique problems that have to be addressed in order for the interconnected LANs to operate efficiently. One of the problems is that each port has to function as if it were a station on the LAN that is connected to it and at the same time function as a part of the switch. When it functions as a station on the LAN, the port is obliged to practice the protocol associated with the LAN. For example, if a Token Ring LAN Segment is connected to the port, the port must operate according to the Token Ring Protocols set forth by the IEEE 802.5 Standard. Likewise, the port must behave in accordance with MAC bridge standard IEEE 802.1D.

Even though none of the above standards mandates setting of A/C bits by a switch port (details set forth below) in an LLC frame, certain customs and usage in the Token Ring environment requires setting of these bits by stations to which the frame is addressed and is copied. In particular, the device drivers in the protocol stack of host stations rely on the setting of the A/C bits to determine if a session is being maintained. If the A/C bits are set to logical "1", the frame has been received by the end station. If the A/C bits are set to logical "0", the frame was not delivered. With this reliance, there is a need to set the A/C bits or else the protocol stack does not function effectively.

On the other hand, if the switch port sets the A/C bits in all frames, destination stations on receiving frames with the A/C bits set to logical "1" would issue error reports. These error reports require action which would necessarily slow down the ring.

One obvious solution is for the switch port to set A/C bits only in frames that it forwards. The problem with this solution is that the switch maintains a database of thousands of addresses. It is not possible to examine all the addresses to determine if the frame is being forwarded to set the A/C bits in a timely manner. Even if it were possible, the device, such as a high speed CAM (Contents Address Memory) for performing the examination would be extremely expensive and unnecessarily increase the product cost.

As a consequence, there is a need for a device and method that is low cost and effective in controlling the A/C bits at switch ports.

SUMMARY

It is one object of the present invention to provide a LAN switch with ports that process frames in such a way that neither the stations on the LAN segment (also called port segment) connected to the port nor drivers in the protocol stack of stations connected to the port segment are affected adversely.

According to the present invention, a database containing addresses of stations on the port segment is generated. As LLC frames from stations on the segment enter the port, the destination address is compared with the database to determine if the destination is on the same segment as the source station. If both destination and source stations are on the same LAN segment, the frame is forwarded on the LAN segment without modifying the A/C bits. If the source and destination stations are not on the same segment, the port set the A/C bits to '1' and forward the frame onto the LAN segment and/or the switch fabric.

The setting of A/C bits is done on the fly so as not to slow down the ring.

In addition, a dynamic and effective way of generating and maintaining the database is disclosed.

DETAILED DESCRIPTION OF THE PREFERRED EMBODIMENT

Figure 1:
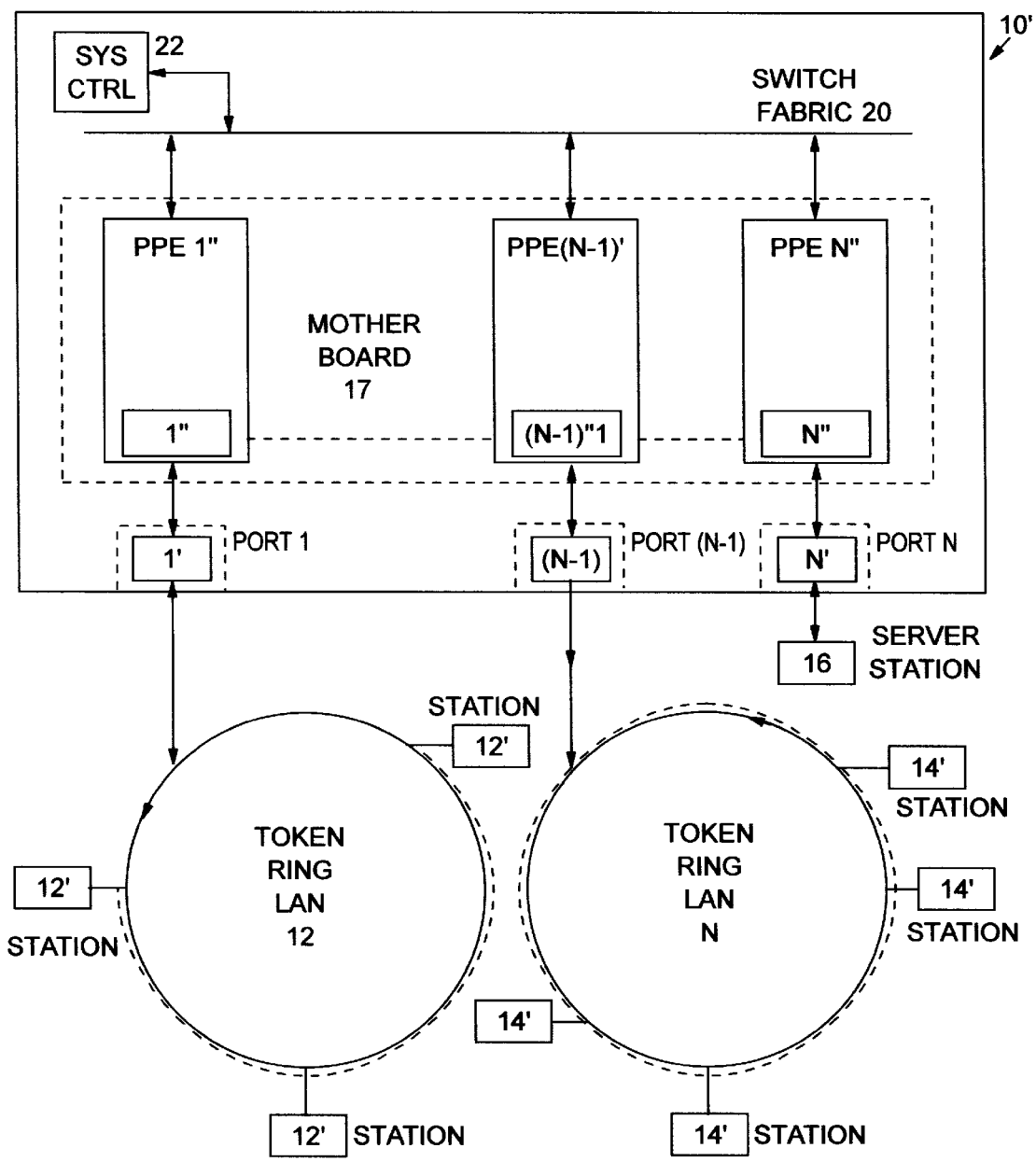
FIG. 1 shows a communications network including a token ring switch according to the teachings of the present invention.

FIG. 1 shows Switching System 10 connected to Token Ring LAN 12 through Token Ring LAN N and Server Station 16. Token Ring LAN 12 through Token Ring LAN N are all identical and operate in accordance with the IEEE 802.5 standard well known as the Token Ring LAN. The Token Ring LAN 12 has a plurality of stations 12' connected thereto. The dotted line between stations indicates that additional stations can be attached to the Ring. Likewise, Token Ring LAN N has a plurality of stations 14' connected thereto. Even though only two Token Ring LANs are shown in FIG. 1, additional LANs can be attached to ports of the Switching System 10. In addition, additional single stations can also be attached to ports of the Switching System 10. Finally, different types of LAN, such as ethernet, IEEE 802.3 standard or other types can also be connected to ports of the LAN. The invention to be described hereinafter particularly relates to the Token Ring LAN. Hence, the discussion in the remaining portion of this application will be directed to the Token Ring LAN and protocol as defined by the IEEE 802.5 standard for LANs.

Still referring to FIG. 1, the Switching System 10 includes a Housing 10' and Port 1 through Port N connected to the Housing. The ports are fitted with Connector 1' through N' and the connectors are connected by appropriate conductors, only three of which are shown in the figure, to the token rings and server station. The Switching System 10 includes a Switch Fabric 20, System Controller (SYS CTRL) 22, Motherboard 17 and Port Processing Element PPE 1" through N". The Switch Fabric 20 provides the switching function in the switching system and can be elaborate as a complex crosspoint switch system or simple as a high speed bus system. The System Controller 22 is coupled to the Switch Fabric 20 and provides the system level management for the Switching System 10. In the preferred embodiment of this invention, the System Controller 22 is a microprocessor. The Motherboard 17 supports the plurality of port processing elements. Each port processing element interconnects an associated port to the Switch Fabric 20. It should be noted that although each PPE is shown as independent units between the port and the switch, this is only for purposes of illustration and should not be construed as a limitation on the scope of the present invention. In an actual implementation, the components which perform functions between any ports and the switching fabric may be shared and can be arranged in a plurality of ways on a support board referred to as a motherboard or any other state of the art method and structure used for coupling a switch port to the switching fabric. Each of the port processing elements 1" through N" includes A/C bit setting devices 1'", N−1'" and N'". The A/C bit setting devices, details of which is set forth below, selectively sets A/C bits in a frame. Except for the A/C bit setting devices, the Switching System 10 is substantially similar to the IBM 8272 Nways Token Ring Switch. The switch is marketed by IBM and described in IBM Publication G224-4418-05, entitled "IBM 8272 Nways Token-Ring LAN Switch Specification Sheet", incorporated herein by reference.

Figure 2:
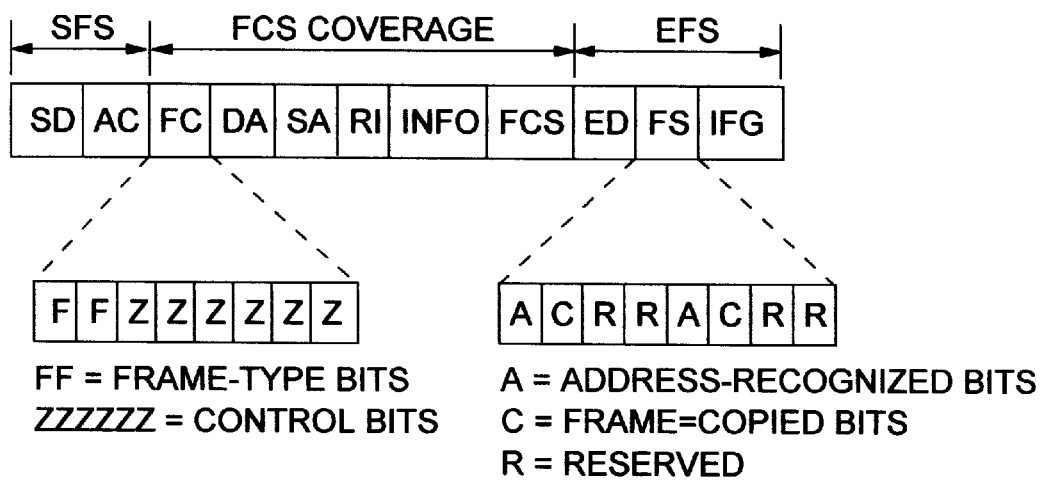
FIG. 2 shows a frame format for a token ring frame.

Turning now to FIG. 2, the Token Ring Frame Format according to IEEE 802.5 standard is shown. The various fields in the frame are described in the figure. The frame is used for transferring both Media Access Control (MAC) and Link Layer Control (LLC) messages. Since this is a standard Token Ring frame which is well known to those skilled in the art, detailed discussion of the various fields will not be given. Only the fields which are germane to the present invention will be discussed further. The relevant fields are the Frame Status (FS) field and the Frame Control field which are both 8-bits in length. The bits of interest in the FS field are the Address Recognize Bits (A) and the Frame Copy Bits (C). As will be discussed below, these are the bits which the switch port sets in LLC frames not destined to a station on the same token ring segment connected to the same port. The bits of interest in the FC field are the FF bits which identify the frame type as either MAC frame or LLC frame.

Figure 3A:
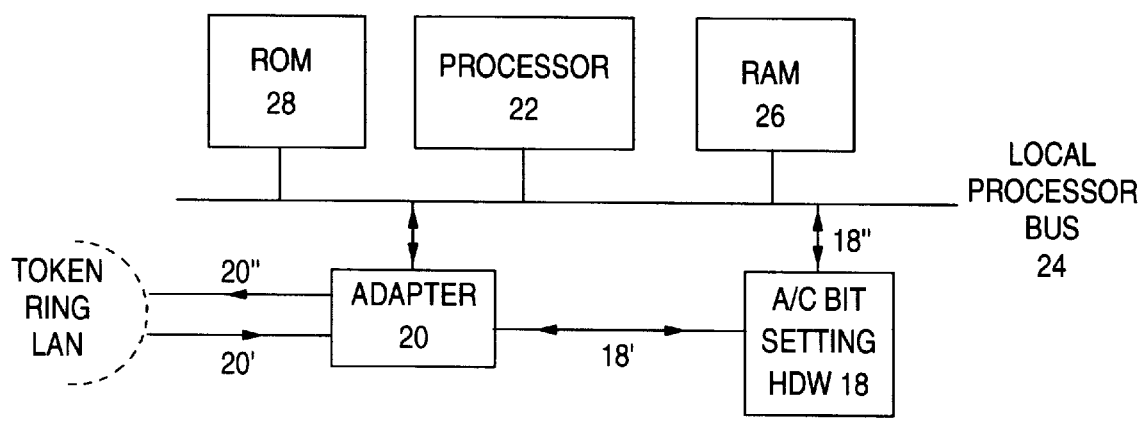
FIGS. 3A and 3B show diagrams of the bit adjusting device according to the teachings of the present invention.

FIG. 3A shows a block diagram of the bit setting device according to the teachings of the present invention. The bit setting device includes A/C bit setting Hardware (HWD) 18, portions of Adapter 20 and a software function implemented by Processor 22. The Processor 22 includes a Local Processor Bus 24, RAM 26 and ROM 28. With this processor based system, the ROM 28 stores the algorithm which causes the Processor 22 to perform the A/C bit setting function of the present invention. Flowcharts showing the algorithm will be given hereinafter. The RAM 26 is used by Processor 22 to store information and to set up buffers and other software components that are used in practicing the present invention. The Adapter 20 is substantially similar to the IBM Token Ring adapter described in IBM Publication SC30-3708-00, entitled "Token-Ring Network LANStreamer Adapters".

The Adapter 20 receives serial data from the token ring on Conductor 20', processes the data in the respective fields as shown in FIG. 2 and outputs the data in a serial stream on Conductor 20'. As the Adapter 20 identifies fields in the frame, the processor is interrupted and the information is forwarded along the processor bus to the RAM. In the RAM, the processor is free to process or manage the data according to the stored algorithm in ROM 28. The adapter also isolates selected fields such as the Address Field in the frame and forwards it to the A/C bit hardware 18 over Conductor 181". The A/C Bit Setting Hardware 18 in turn generates information which is fed back over 18' to Adapter 20. Communication between the processor and A/C Bit Setting Hardware 18 is done over Conductor 18".

Figure 3B:
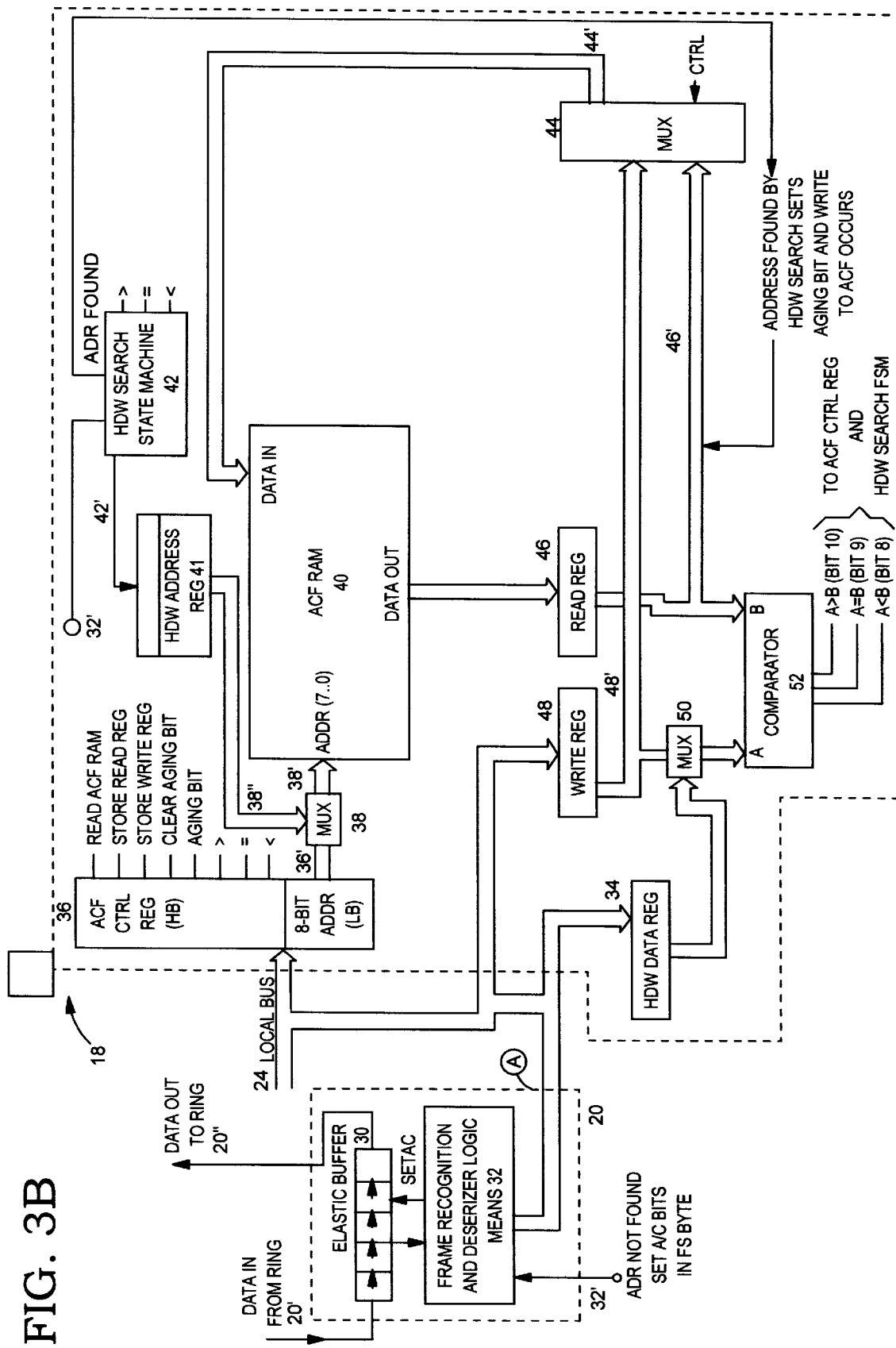

FIG. 3B shows a more detailed block diagram of the A/C bit setting device according to the teachings of the present invention. The showing in FIG. 3B primarily describes the A/C Bit Setting Hardware 18 (FIG. 3A) and the portion of the bit setting hardware residing in Adapter 20. For simplicity, common elements in FIGS. 3A and 3B are identified by the same numeral. The portion of Adapter 20 that is of interest to the present invention includes Elastic Buffer 30 and Frame Recognition and Deserializer Logic Means 32. The Elastic Buffer 30 is a multi-stage shift register which accepts serial data in from the ring on Conductor 20' and outputs it on Conductor 20". Signals from the Elastic Buffer are fed serially into the Frame Recognition and Deserializer Logic Means 32. The Frame Recognition and Deserializer Logic Means 32 includes any well-known protocol handler which is an off-the-shelf item that can be purchased for token ring networks. The protocol handler sections a receive frame into the respective fields set forth in FIG. 2.

The fields are changed from serial to parallel data and fed over the Parallel Bus 32' to Hardware Data Register 34 (an element in the A/C Bit Setting Hardware 18). Data from Frame Recognition and Deserializer Logic Means 32 is fed over the local bus (24) to Processor 22. Communication between the Processor and the Frame Recognition and Deserializer Logic Means 32 is effectuated via an interruption procedure, which is a well-known procedure for one unit in a system to talk with another unit. It should be noted that the Frame Recognition Deserializer Logic Means 32 receives control signals on Line 32'. As will be discussed subsequently, when the destination address of an LLC frame is not found in ACF RAM 40 (details set forth below), this line is made active and logic in the Deserializer Logic Means sets the A/C bits in the FS Byte of the frame currently passing through the buffer.

Still referring to FIG. 3B, the hardware portion of the A/C bit setting device includes ACF Control Register 36 connected to Local Processor Bus 24. The output from ACF Control Reg 36 is fed over Bus 36' to MUX 38. The output from MUX 38 is fed over Bus 38' to ACF RAM 40. As will be explained subsequently, the ACF RAM stores the table of Source Addresses against which a Destination Address in an LCC Frame is compared to determine if the A/C bits in the LCC frame should be set to 1 or left unmodified. Bus 38" interconnects Hardware Address Register 41 to MUX 38. Hardware Search State Machine 42 is connected over Bus 42' to the Hardware Address Register 41. The Hardware Search State Machine 42 is controlled by simplex lines labeled >, = or <. As will be explained subsequently, depending on the setting of each of one of these lines, an appropriate address is loaded into Hardware Address Register 41. It is this address that is used to search the list of Source Addresses (SA) in the ACF RAM 40.

Still referring to FIG. 3B, data into the ACF RAM 40 is fed over Data In Bus 44' from MUX 44. The MUX 44 has Bus 48' and 46' as input busses. Depending on the signal on the control line which is provided by the microprocessor, either the Bus 48' or 46' are selected and is fed back as data into ACF RAM 40. The Bus 46' is outputted from ACF Read Register 46. As will be explained subsequently, when selected bits in ACF Control Register 36 is activated, a specific address in ACF RAM 40 is read out into the ACF Read Register 46. Similarly, ACF Write Register 48 is connected on its input to Local Bus 24. Write Register 48 writes information into selected locations of ACF RAM 40.

Still referring to FIG. 3B, the ACF RAM 40 stores a table of addresses that are the Source Address (SA) of stations connected to the LAN segment that the port supports. It should be noted that each port is provided with the structure set forth in FIG. 3B. Thus, if the switch assembly is an eight port switch, the circuit would be repeated 8 times one at each port; 16 port switch, the circuitry would be repeated 16 times and so forth. Because the circuits are identical, the description is intended to cover the circuits at each port of the switch. In the preferred embodiment of this invention, the ACF RAM 40 is a 48-bit X 256 location RAM. The table can store the addresses of 256 stations, which is the maximum number of stations that a user would elect to connect a ring that is connected to the port and permitted by the IEEE 802.5 standard.

Figure 3C:
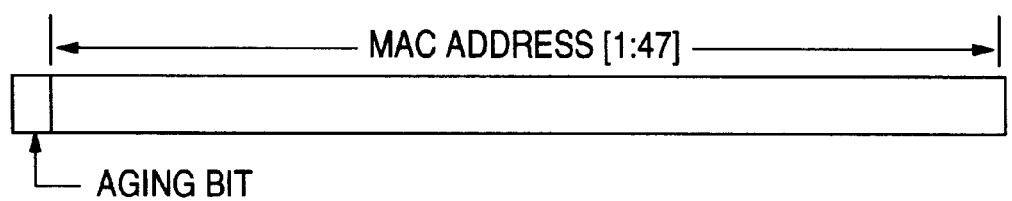
FIG. 3C shows the format for a Record in the database table stored in the RAM.

Turning to FIG. 3C for the moment, the format for a record in the ACF RAM 40 is shown. As stated previously, the ACF RAM 40 contains the source addresses of station on the segment (rings and segments are used synonymously in the specification) connected to that particular port. The addresses of the record are inserted in bits 1 through 47. The high-order bit 48 is the aging bit. Depending on the setting of this bit, the microprocessor under control of programs (to be discussed hereinafter) will delete or not delete the entry. In particular, if the bit is on (i.e., set to a logical 1), the entry is not deleted. With the bit on, the suggestion is that the address of the station which is in the register is active on the network. If the bit is a logical 0, the address is struck from the table on the assumption that the station is no longer active. Therefore, the 48th bit in the ACF RAM is used for address aging control.

Referring again to FIG. 3B, the ACF Control Register 36 is a 2 byte register. The high-order byte of the ACF Control Register (CTL REG) has four command bits and four read-only status bits (both set of bits are described subsequently). The low order byte of the ACF Control Register 36 is used as the address pointer when executing one of the four commands. For implementation purposes, both bytes of this register must be written at the same time; i.e., only half-word writes are allowed to any of the ACF register. With respect to the high-order byte of this control register, the function of each of the bits will now be described.

Bit 15 is used to initiate a read of the ACF RAM 40 at the address pointed at by the low byte of the ACF Ctrl Reg 36.

Bit 14 is used to initiate a write of the ACF RAM 40 at the address pointed at by the low byte of ACF Ctrl Reg 36. The source of data for this write command is the ACF Read Register 46.

Bit 13 is used to initiate a write of the ACF RAM 40 at the address pointed at by the low byte of ACF Ctrl Reg 36. The source of data for this write command is the ACF Write Register 48.

Bit 12 is used in conjunction with bit 14. When the microprocessor desires to restore the ACF Read Register 46 into the ACF RAM 40, it can clear the address aging bit at the same time by also activating this bit.

Bit 11 is a read-only status bit reflecting the high-order bit of the ACF Read Register 46, i.e. the age bit for the location just fetched.

Bit 10 is a read-only status bit reflecting the "greater than" output of the 47-bit comparator 52. The ACF Write Reg 48>ACF Read Reg 46.

Bit 9 is a read-only status bit reflecting the "less than" output of the 47-bit comparator 52. The ACF Write Reg 48<ACF Read Reg 46.

Bit 8 is a read-only status bit reflecting the "equal to" output of the 47-bit comparator 52. The ACF Write Reg 48=ACF Read Reg 46.

Still referring to FIG. 3B, the ACF Read Register 46 buffers the contents of ACF RAM 40 from the address in ACF Cntl Reg [7:0] 36 when bit 15 of the ACF Control Register 36 is activated. In the preferred embodiment of this invention, the ACF Read Register 46 is a 48-bit register. As will be explained subsequently, the contents of this register is fed into the B side of the 47-bit Comparator 52.

The ACF Write Register 48 is a 48-bit register which contains information which is written to the address in ACF Cntl Reg [7:0] 36 of ACF RAM 40 when the ACF Ctrl Reg bit 13 is set by the microprocessor. The output from this write register feeds Multiplexer (MUX) 44 and 50. From MUX 50, the information is fed into the A side of Comparator 52.

The Comparator 52 is a 47-bit comparator with an A side and B side and is used by the microprocessor for determining at what location new addresses should be entered. As will be explained subsequently, it should be remembered that source addresses are maintained in the ACF RAM 40 in an ascending numerical order. It should also be noted that Comparator 52 outputs three control signals which are fed into bits 10, 9 and 8 of Control Reg 36 and the Hardware Search State Machine 42. It should be noted that in Comparator 52, there is an A side of the comparator and a B side as illustrated in the Figure. When the A side is greater than the B side, the signal labeled 'greater-than' (>), feeds into the hardware search state machine and bit 10 of the ACF Control Register 36 is activated. If side A equals side B, the signal activates the mid-line labeled 'equal' to on the Hardware Search State Machine 42 and activates bit 9 in the ACF Control Register 36. Finally, if A is less than B, bit 8 is activated and the line carrying the same signal is activated in the Hardware Search State Machine 42.

In the preferred teachings of this invention, the hardware is used for executing a binary search in the ACF RAM 40. In addition, the microprocessor and appropriate algorithms are used for entering information in the ACF RAM 40 and for updating aging information in the ACF RAM 40. The aging updating and other housekeeping to the ACF RAM 40 is referred herein as maintaining the ACF RAM 40. In essence, the hardware is used for doing a binary search to determine if a source address of MAC frames are in the ACF RAM 40. Similarly, it is used to determine if the destination address in an LLC frame is in the ACF RAM 40. If the Destination address of the LLC frame is not in the ACF RAM 40, the A/C bits are set to 1 by the Frame Recognition and Deserializer Logic Means 32. If the Destination address of the LLC frame is in the ACF RAM 40, the LLC frame is outputted back on the LAN segment without modifying the A/C bits.

Before describing the algorithm which is used according to the teachings of the present invention, it is worthwhile reviewing some background information relative to token ring as described in the IEEE 802.5 standard. The LLC (Link Level Control) frames transport data in the network. The LLC is one of the eight layers which is defined by the International Standard Organization for digital networks.

Other terms which are standard in the token ring protocol is the Active Monitor. This identifies the station which is in control of the LAN. This station has the responsibility of generating the token, etc.

Another terminology is the Stand-by Monitor. All stations that are not the Active Monitor take on the roll of the Stand-by Monitor and detect when the Active Monitor fails.

Finally, the Neighborhood Notification Process is part of the IEEE 802.5 standard. It allows the stations to obtain the Source MAC Addresses of the nearest upstream neighbor station on the Ring. The source addresses are provided in the AMP and SMP MAC frames that are generated in response to received AMP and SMP MAC frames. The process is started by the Active Monitor issuing an AMP MAC frame, and is ended when the Active Monitor receives either an AMP or SMP MAC frame with the A/C bits set to 0. The present invention uses this protocol to generate the Source Address Table. The Neighbor Notification Process is described in U.S. Pat. No. 4,507,777, assigned to the Assignee of the present invention and is incorporated herein by reference.

Having described some of the background information necessary to understand the present invention, the algorithms which are used by the microprocessor to make entries in the Table in ACF RAM 40 (FIG. 3B) and to maintain it and for the binary search of the ACF RAM 40 will now be given.

Figure 4A:
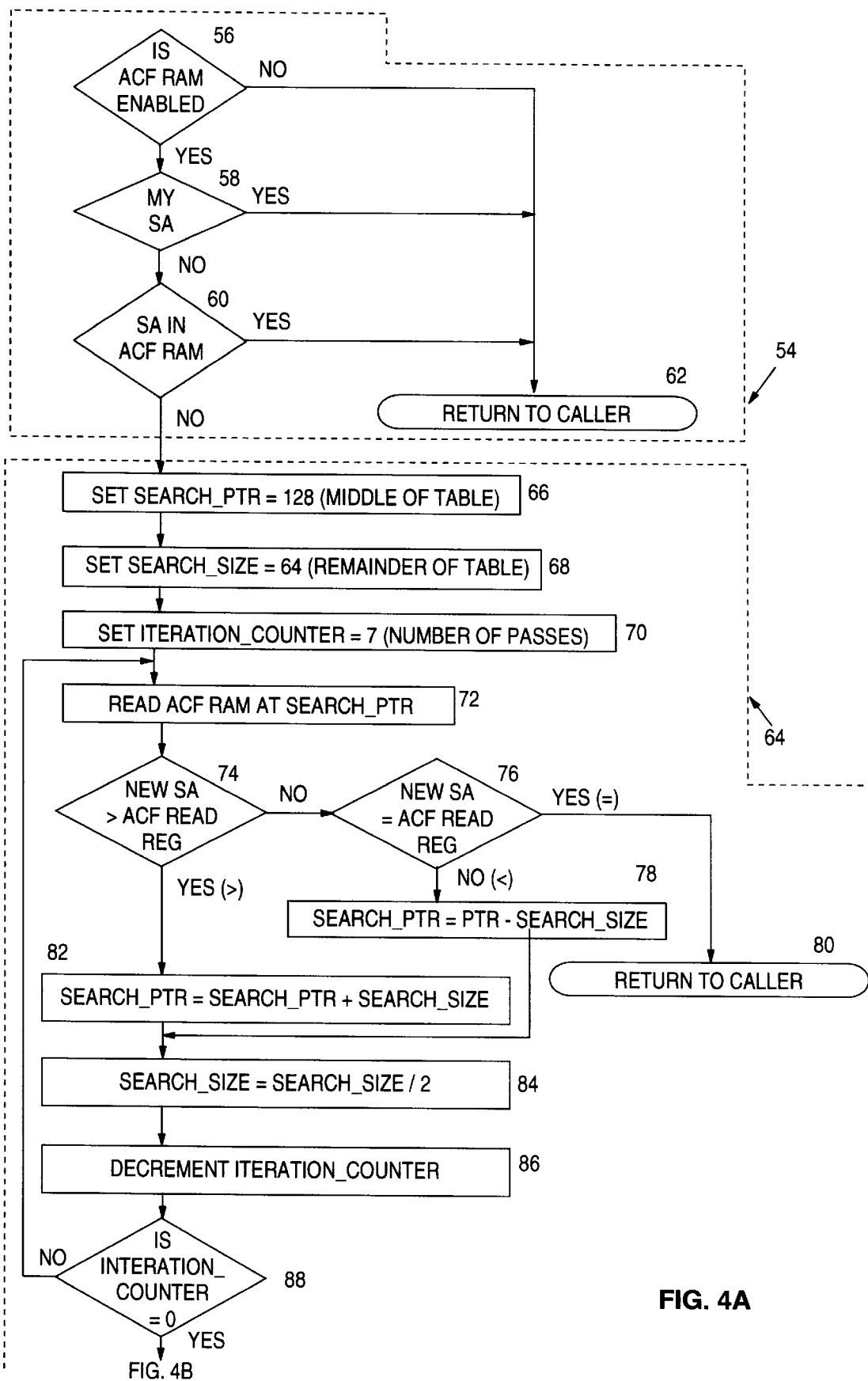
FIGS. 4A and 4B show flowcharts of the algorithm for adding entries to the table.

FIG. 4A shows a flowchart of an algorithm for adding a New Source address (SA) to the table in the ACF RAM. As stated above, the new entries are learned from the Source Address of MAC frames received as a result of the Neighbor Notification process. FIG. 4A shows two major functions of the algorithm. The top portion labelled 54 does a check of Source Addresses (SA) for Address Compare Function (ACF). This portion of the algorithm is a three step process that determines if the Address Copy Function RAM is enabled (block 56). In block 58, the algorithm determines if the Source Address in a particular frame is the Source Address of the port (My SA). If the address is that of the port, there is no need to waste a table location to enter the address. In block 60, the algorithm makes sure that the source address is not already in the ACF RAM. If the three criteria are not met, there is no need to add an entry to the ACF RAM and the algorithm exits (return to caller) in block 62.

Figure 4B:
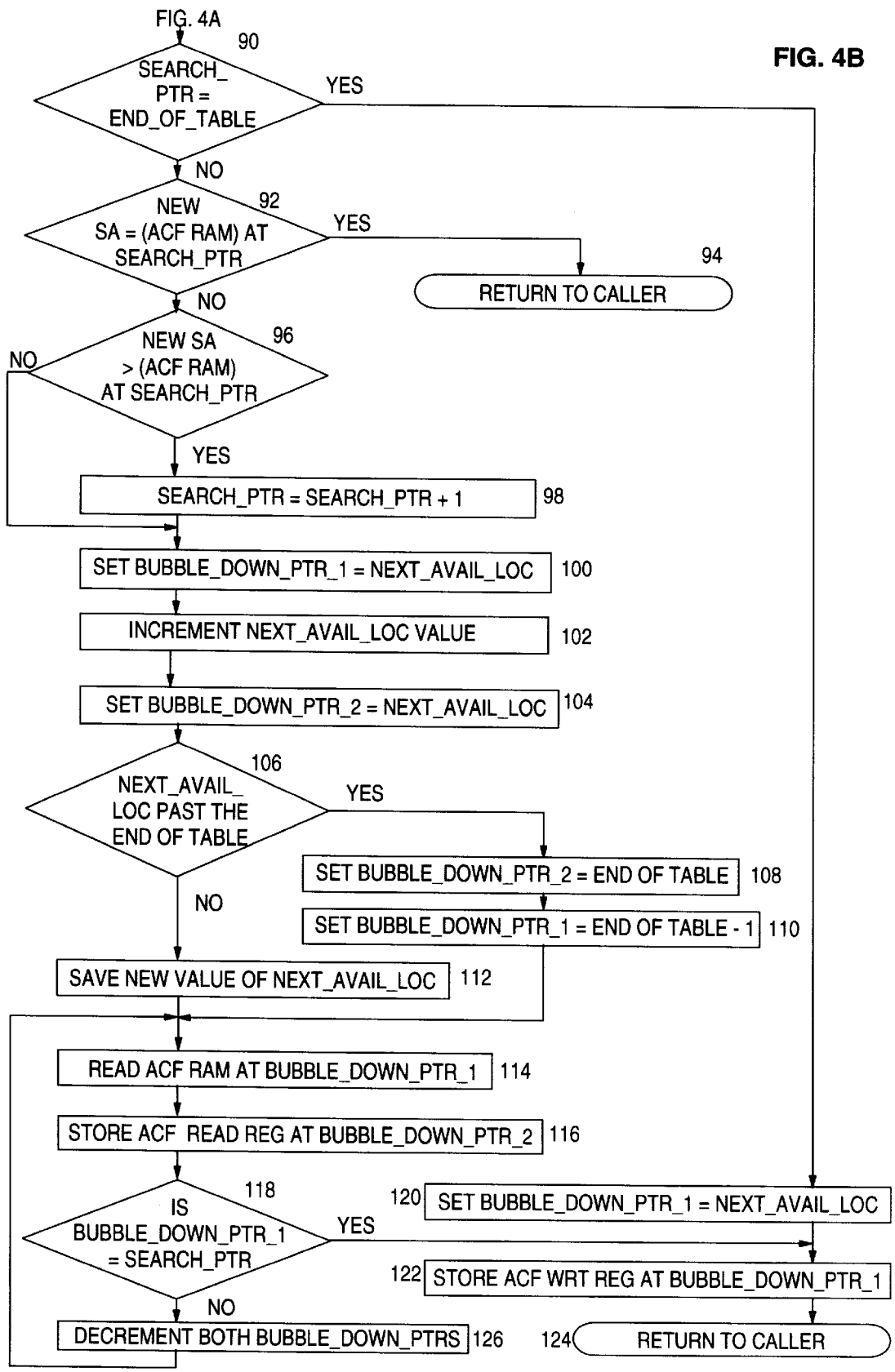

Referring now to FIGS. 4A and 4B, if it is determined that a source address should be added to the ACF RAM, the flowchart moves to the add source address phase of the algorithm identified by numeral 64, FIG. 4A, and the entire flowchart shown in FIG. 4B. The portion of the flowchart identified by numeral 64 (FIG. 4A) is the part that does a software binary search of the entire table to locate the position where the new entry is to be inserted.

After seven loop iterations of binary halving, the flowchart passes from block 88 (FIG. 4A) to block 90 (FIG. 4B).

In summary, the portion of the flowchart identified by numeral 64 (FIG. 4A) establishes the variable search pointer equal to the new entry position. The new Source Address (SA) will either go at the location of the search pointer (if the new SA is less than what is currently there) or the location right after it (if the new SA is greater than what is currently there). It should be noted that there is an early exit block 80 for the special case in which the new SA equals what is currently at the search pointer. This boundary condition does not normally occur. It can only happen if the microprocessor (FIG. 3A) is unable to keep up with the addition of entries in a timely manner. This exit is for the case in which two frames with the same SA are queued in the microprocessor's receive buffers before the address is entered into the table. The microprocessor will add entries on the first frame and still process the second frame because it was not marked in the table when it was received. This exit (block 80) prevents duplicate entries from entering the table. It should be noted that if a powerful enough microprocessor is used, this condition will not happen since the processor will be able to keep up with the addition of entries in the ACF RAM (FIG. 3B).

Still referring to FIG. 4A, the process steps in the algorithm identified by numeral 64 are as follows. In block 66, the search begins by initializing a pointer to 128 (middle of the table). In this embodiment, the table contains a maximum of 256 entries, 128 is one-half the total size. The algorithm then descends into block 68 where it sets a search size of 64 (one-half of the remainder of the table). The algorithm then descends into block 70 where it sets the number of loop passes. In this implementation, the number of passes are set to be 7. The algorithm then descends into block 72 where it reads the contents of the ACF RAM at the current value of the search pointer. The program then descends into decisional block 74 where the value of the new source address to be added, which has been loaded into the ACF Write Register (48) show in FIG. 3B by the microprocessor, is compared with the value just read from ACF RAM. If the new source address is not greater than the ACF Read register, the program enters block 76, where it tests if the new source address is equal to the ACF Read register. If it is, this means that the new address is already in the table. The program exits at block 80 to avoid making a duplicate entry.

Returning again to block 74, if the new source address is greater than the value in the ACF Read register, the algorithm descends into block 82 where the search pointer is set to the value of the search pointer plus the current search size. The program then descends into block 84 where the search size set is equal to the search size divided by 2. Returning to block 76 for the moment, if the new source address is not equal to the ACF Read register, the program descends into block 78 where the search pointer is set equal to the search pointer minus the search size and the algorithm descends into block 84. From block 84, the algorithm descends into block 86 where it decrements the iteration counter and descends into block 88. In block 88, a test is run to see if the iteration counter is zero. If it is not, the program loops and performs the previously described steps. If it is, this means the search is over and the position at which the new entry should be placed as been determined.

Referring now to FIG. 4B, the remaining portion of the flowchart for adding an entry to the ACF RAM is shown. In particular, FIG. 4B represents the portion of the algorithm that displaces all the addresses downwardly from the new entry point down to the current end of the table in order to make room for the new address. The downwardly displacement is referred hereinafter as "bubble down". The bubble down routine is covered by blocks 90 through 126 and is done by keeping track of the next available location. As entries are added to the table, the next available location (Next Avail Loc) increments towards the bottom (it pegs at the end of the memory). As new entries are added, the number of locations that need to "bubble down" to make room varies with the new entries' location and the current size of the table.

It should be noted how the flowchart handles two boundary conditions at block 90 and 106, respectively. First, the condition in which the new entry goes at the end of a full table. For this condition, there is no need to "bubble" any entries down. The new location goes directly into the last location. Second, the condition in which the table is full and the new entry goes into the table at a location other than the end. For this condition, the next available marker must be pegged at the end and not allowed to wrap.

A description of each block in FIG. 4B will now be given. In block 90, the algorithm does a boundary test for the condition in which the search has discovered that the table is currently full of entries and the new source address goes at the end of the table. When this is true, the program moves directly to block 120 where it initializes the bubble down pointer to the next available location (the end or last address in the table since it is full). From block 120, the algorithm descends into block 122 where it stores the new source address value into the table. The program then exits at block 124 having completed the table update. Returning to block 90, if the search pointer is not at the end of the table, the program descends into block 92 where a test is made to see if the contents of the ACF RAM at the search pointer are equal to the value of the new source address to be added. If yes, the program moves to block 94 to avoid making a duplicate entry. When the test at block 92 determines that the new source address is not in the table, the program descends into block 96. In decisional block 96, a test is made to see if the value of the new source address to be added is greater than the contents of the ACF RAM at the search pointer. If the new value is greater than the value currently at the search pointer, the program enters block 98, where it increments the search pointer to the next position, which becomes the correct entry point for the new value. When the new value is less than the current value, block 98 is bypassed and the current search pointer represents the correct new entry point. After both cases, the program continues at block 100 where the bubble down pointer 1 is initialized to the current end of table value. Next, the program descends into block 102 where the current end of table (next available location) marker is incremented to reflect the addition of this new entry and then descends into block 104. At block 104, bubble down pointer 2 is initialized to the new end of table address and the program moves into decisional block 106.

Continuing at block 106, a boundary test is made for the condition in which the table would either overflow or wrap to the beginning because the table is currently full. When this condition is detected, the program moves to include block 108 and 110 before returning to the main flow at block 114. These two block re-initialize bubble down pointers 2 and 1, respectively, to avoid a table warp around or overflow condition. When the boundary condition does not exist, decisional block 106, the algorithm descends into block 112 which saves the new value for the next available location (a value less than or equal to the end of the table) and then enters block 114. Blocks 114 and 116 represent the actual bubble down movement of entries. In block 114, the entry at bubble down pointer 1 is read from memory and in block 116 that value is stored bubble down pointer 2. The algorithm continues with entry into decisional block 118 where a test is made to see if bubble down pointer 1 has reached the value of the new entry point. If not, block 126 is entered in which both bubble down pointers are decremented and flow is returned to block 114. When the new entry position is reached, the algorithm moves from block 118 to block 122 where the new source address entry is stored at its correct position in the table. The algorithm then exits through block 124 having completed its purpose.

Figure 5A:
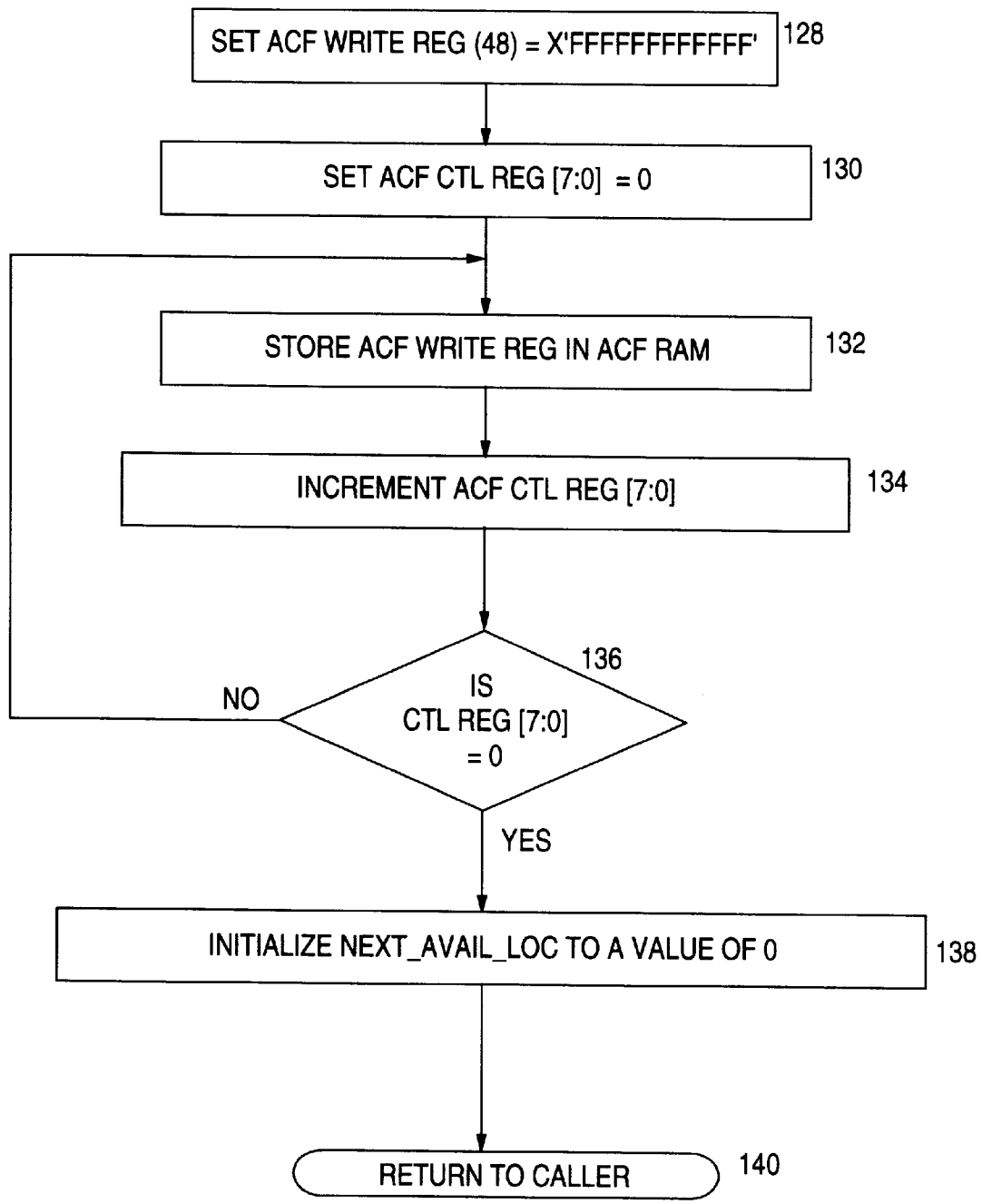
FIG. 5A shows a flowchart of the routine for initializing the RAM.

FIG. 5A shows a flowchart of the algorithm used to initialize the ACF RAM 40 (FIG. 3B). Generally, the ACF RAM 40 is initialized at power on of the system. The process steps 128 through 140 set all locations in the ACF RAM 40 to a selected initial value. In the preferred embodiment of this invention, the value is X'FFFFFFFFFFFF'. The highest possible address value that can be represented in a 47 bit address plus an initialized aging bit value of 1. The process also initializes the Nex_Avail_Loc pointer to a 0.

Still referring to FIG. 5A, in particular, block 128 sets the ACF Write Register 48 (FIG. 3B) equal to the initial value. In block 130, the address into the ACF RAM 40 is initialized to 0. Block 132 writes the value in the ACF Write Register 48 into the ACF RAM 40 at the location indicated by the address in ACF Ctl Reg 36 bits 7:0. The address is then incremented in block 134 and tested for wrap to zero in block 136. If a wrap to zero has not occurred, the algorithm continues to initialize the next sequential location at block 132, otherwise the Next_Avail_Loc pointer is set to 0 and the initialization of the ACF RAM 40 is complete.

Figure 5B:
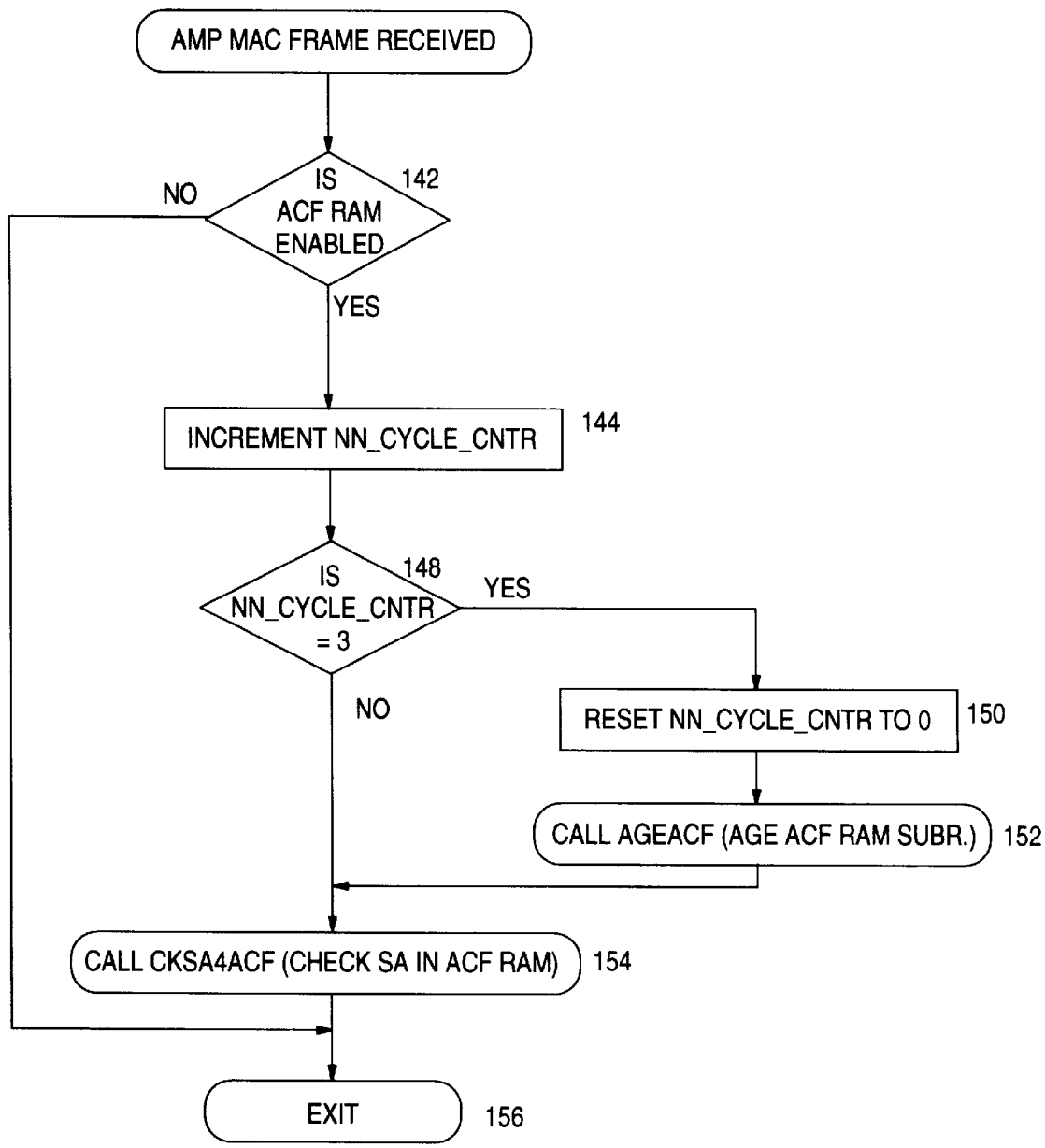
FIG. 5B shows a flowchart of the routine for activating the address add algorithm and aging algorithm.

FIG. 5B shows a flowchart of steps for maintaining the ACF RAM. As may be remembered from the above discussion, the ACF RAM contains a table of source addresses for stations connected to the LAN segment which is connected to a port. The flowchart shows two events which begin upon the receipt of AMP (Active Monitor Present) frames received as a result of the Neighbor Notification process. As pointed out above, this process is started by the Active Monitor Present on the ring and is initiated every 7 seconds. The delay period can be varied without deviating from the spirit or scope of the present invention. As a consequence of this process which is required by the IEEE 802.5 standard, each station announces its presence to its down stream neighbor by using either an AMP or SMP MAC frame, as appropriate. Since the AMP or SMP MAC frames are sent to the broadcast address, they are available for examination by any entity that is connected to the ring segment. The Neighbor Notification Process is well documented in the standard and the patent incorporated above and further details will not be given here. The functions, according to the teachings of this invention, initiated by a receipt of the AMP MAC frame are the address entry routine and the invocation of the address aging algorithm.

The address entry routine adds an address to the ACF RAM 40 and the aging function algorithm deletes addresses of stations which are believed to be no longer in the network. In particular, AMP frames are counted to initiate the invocation of the address aging algorithm. After three Neighbor Notification cycles, the aging routine is invoked to delete stations from the ACF RAM. With reference to FIG. 5B, in block 142, the routine checks to see if the ACF RAM function is enabled. If it is not, the algorithm exits through block 156. If it is, the algorithm descends into block 144 where it increments the Neighbor Notification cycle counter. This counter keeps track of the start of Neighbor Notification cycles. The algorithm then descends into block 148 where it checks to see if the counter is at 3. If the counter is at 3, this means that 21 seconds has elapsed since the aging algorithm was last invoked. The algorithm then descends into block 150 where it resets the Neighbor Notification cycle counter to 0 and into block 152 where it invokes the Age ACF RAM Routine (Reference FIG. 6). The algorithm then descends into block 154 where it checks the source address in the ACF RAM (Reference 54 in FIG. 4A) and then exits the routine in block 156. If, at block 148, the cycle counter is less than 3, the algorithm descends into block 154 where it checks the source address in the ACF RAM and exits the routine in block 156.

Figure 6:
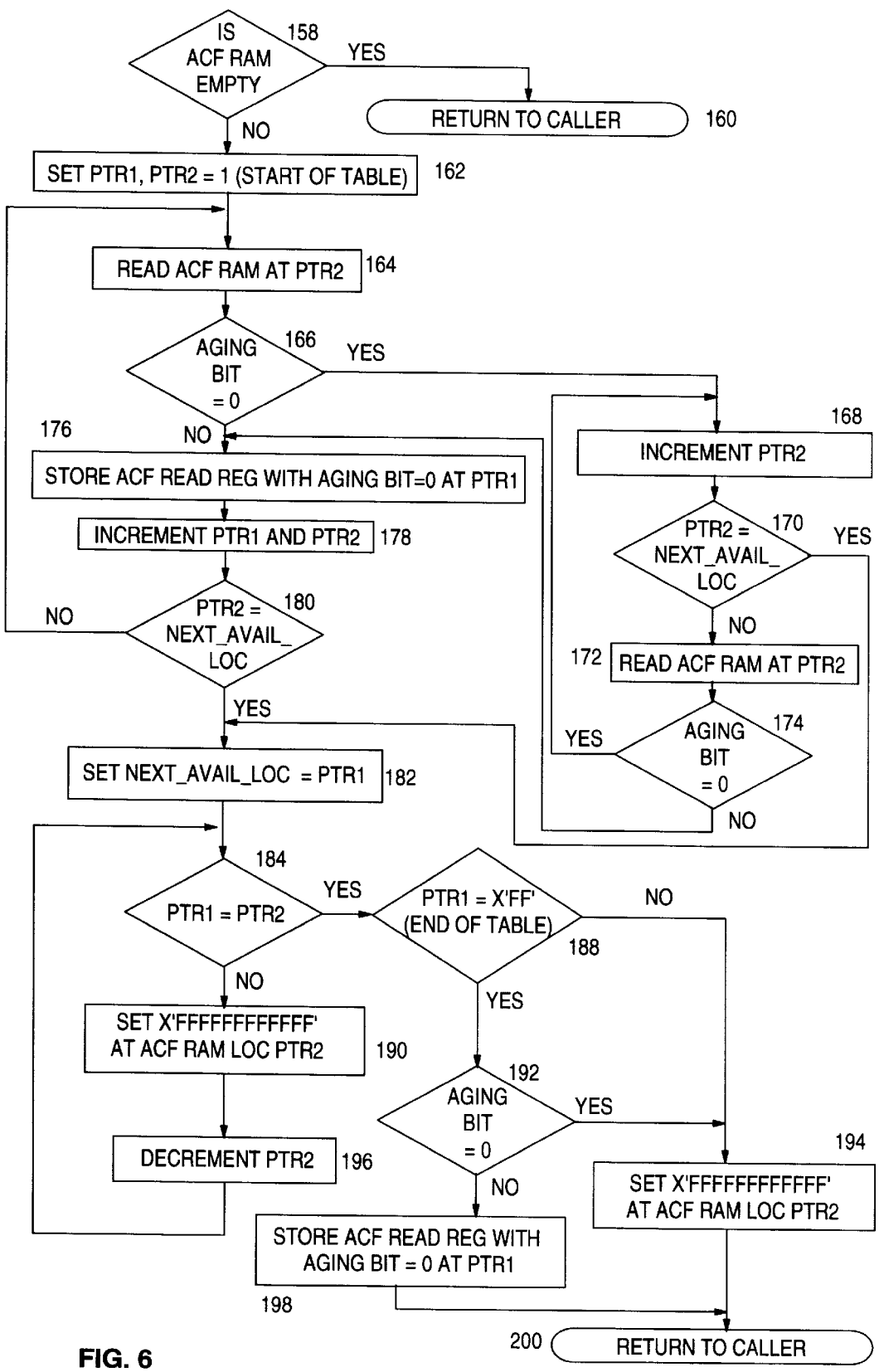
FIG. 6 shows a flowchart of the aging algorithm.

FIG. 6 shows a flowchart of the algorithm for deleting addresses from the ACF RAM. The aging algorithm is called by block 152 sub-routine, FIG. 5B. The intent is to delete from the table addresses that belong to stations that have left the ring. These could be stations that have simply closed or even those that are physically moved to other ports of the switch. To aid in determining which stations are no longer active, an address aging bit (described above) accompanies each address entry. With reference to FIG. 3C, the high-order bit in the address table is the aging bit. Each time the hardware search engine finds a hit on the SA of a MAC frame for which it is searching, it will set the address aging bit for that entry. Also, the routine that adds entries into the ACF RAM 40 adds the new address with the aging bit set to its "on" state. The aging algorithm which is invoked after three normal notification cycles (typically 21 seconds) tests all entries from the beginning of the table to the last user location (it may be recalled relative to the above discussion that the next available location pointer indicates how many valid address entries are in the table). There is no need to search through the unused "X'FFFFFFFFFF" values searching for entries in which the aging bit is off. Entries found with an aging bit value of 0 are purged (deleted) from the table. During each search, all entries with an aging bit value of 1 have their aging bit reset to 0, but the entry is not removed. The next invocation of the algorithm, 21 seconds later (or after three more normal Neighbor Notification cycles) will find entries that have not been re-marked by the hardware search engine.

Still referring to FIG. 6, the algorithm includes blocks 158 through 200. By studying the flowchart, it will be seen that the purge algorithm follows this scheme:

Two pointers are initialized to the beginning of the table, block 162. Pointer 1 is used as the write address into the ACF RAM 40. Pointer 2 is used as the read address into the ACF RAM 40. These pointers will have the same value until an entry must be deleted.

Both pointers start to move down the table searching for an entry that has an aging bit set to "0" (block 164, 166).

If the entry searched has an aging bit of 1, it is reset and both pointers are incremented (block 176).

When an entry with an aging bit of 0 is found (block 166), pointer 2 continues to increment until an entry with an aging bit equal to 1 is found (blocks 168, 170, 172 and 174). This entry is then moved up the table into pointer 1's position (with the aging bit, of course, now reset) (block 176). Then both pointers get incremented (block 178).

The search consisting of the above two steps continues until pointer 2 reaches the current end of the table (blocks 170, 180).

At this point, Pointer 1 becomes the new end of the table (block 182). All entries from the new end to the old end (i.e., pointer 1 to pointer 2) are overwritten with "X'FFFFFFFFFF" to complete the purge of the table (blocks 184, 190, 196).

The routine continues to maintain the table with only active addresses, all ordered in numerically ascending order.

The unused portion of the table remains initialized to all ones. Also, notice that it is possible for pointers 1 and 2 to track together. This implies no addresses need purging. Also, a special test is made for the boundary condition in which the new end of the table actually equals the physical last location of memory (block 188); that is, a table can only hold 256 entries, and it cannot be allowed to wrap.

Figure 7:
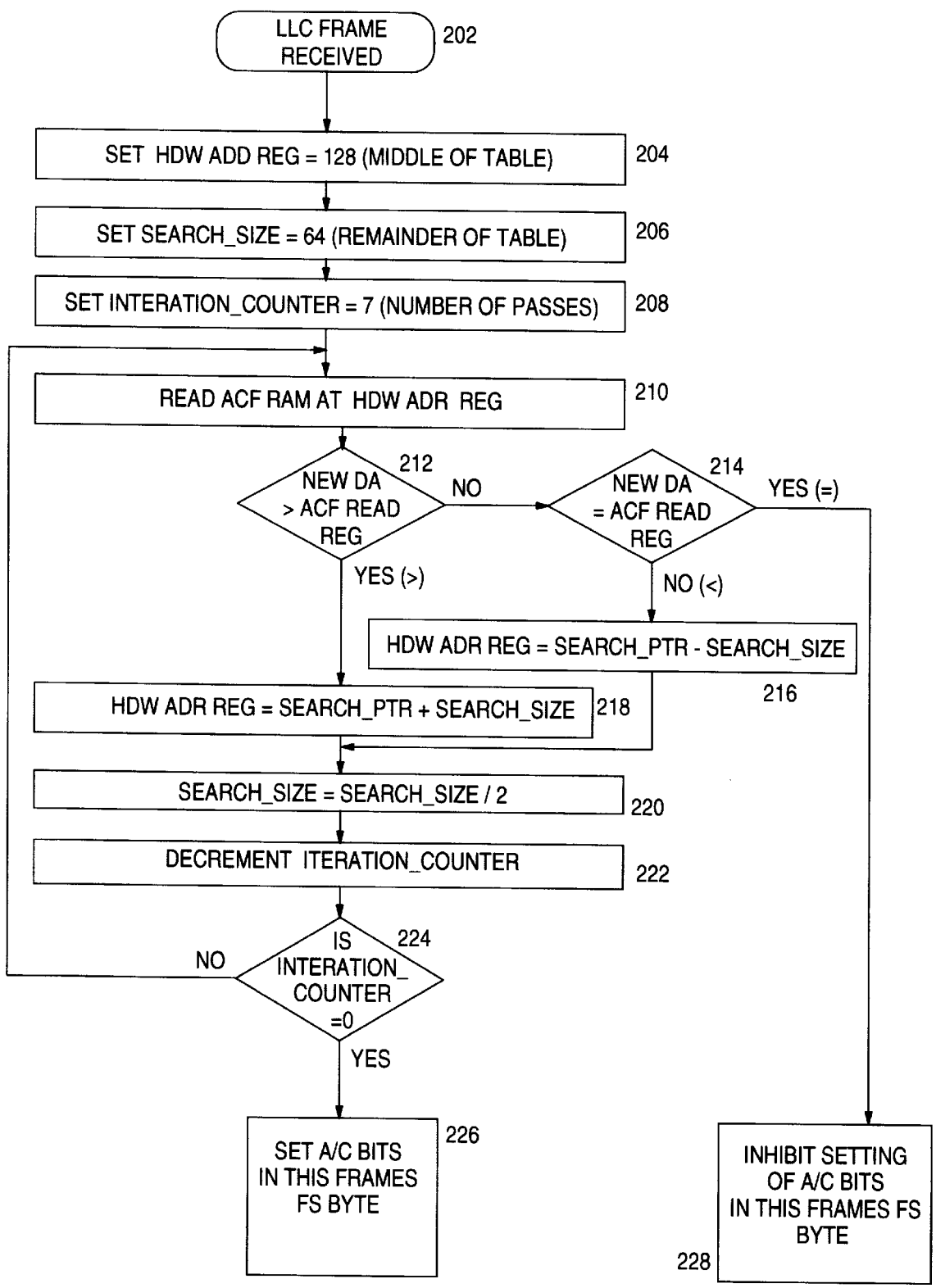
FIG. 7 shows a flowchart for the algorithm used to search the table for the DA of received LLC frames.

FIG. 7 shows a flowchart for the algorithm used to do a binary search of the table. As stated previously, the binary search is done in hardware that is implemented according to the algorithm. The intent of the binary search is to determine if the destination address in a received LLC frame matches any address in the ACF RAM, then this would indicate that the destination to which the LLC frame is directed is on the same ring and the A/C bits in the FS byte are not modified. On the other hand, if the DA address in the LLC frame is not in the ACF RAM 40, then the A/C bits are set to one on the fly and the LLC frame is returned to the ring while the switch port may forward the frame through the switch or purge it. Returning the frame to the ring is necessary to meet the requirement of the IEEE 802.5 standard.

Referring again to FIG. 7, the algorithm includes blocks 202 through 228. In block 202, the LLC frame is received at a switch port. The algorithm then descends into block 204 where the Hardware Address Register 41 discussed above is set to 128 (middle of the table). In this embodiment, the table carries a maximum of 256 entries. The algorithm then descends into block 206 where it sets a search size of 64 (remainder of the table). The algorithm then descends into block 208 where it sets the number of passes. In this implementation, the number of passes are set to be 7. The algorithm then descends into block 210 where it reads the address in the ACF RAM at the address in the Hardware Address Register 41. The algorithm then descends into decisional block 212 where the destination address (DA) in the receive LLC frame (loaded by the hardware into the Hardware Data Register 34) is compared with the address read from the RAM. If the DA address is not greater than the ACF Read Register, the algorithm enters block 214, where it tests if the DA address is equal to the ACF Read Register. If it is, this means that the DA address in the register is on the ring with the source address and the algorithm exits at block 228 without modifying the A/C bits.

Returning again to block 212 (FIG. 7), if the DA is greater than the address read from the ACF Read Register 46, the algorithm descends into block 218 where the search pointer is set to the value of the search pointer plus the search size set forth above. The algorithm then descends into block 220 where the search size is set equal to the search size divided by 2. Returning to block 214 for the moment, if the DA address is not equal to the ACF Read Register 46, the algorithm descends into block 216 where the Hardware Address Register 41 is set equal to the Hardware Address Register 41 minus the search size, and the algorithm descends into block 220. From block 220, the algorithm descends into block 222 where it decrements the iteration counter and descends into block 224. In block 224, a test is run to see if the iteration counter is zero. If it is not, the algorithm loops to block 210 and performs the previously described steps. If it is, this means the DA address is not in the ACF RAM 40, and the algorithm descends into block 226 where the A/C bits are set.

Figure 8:
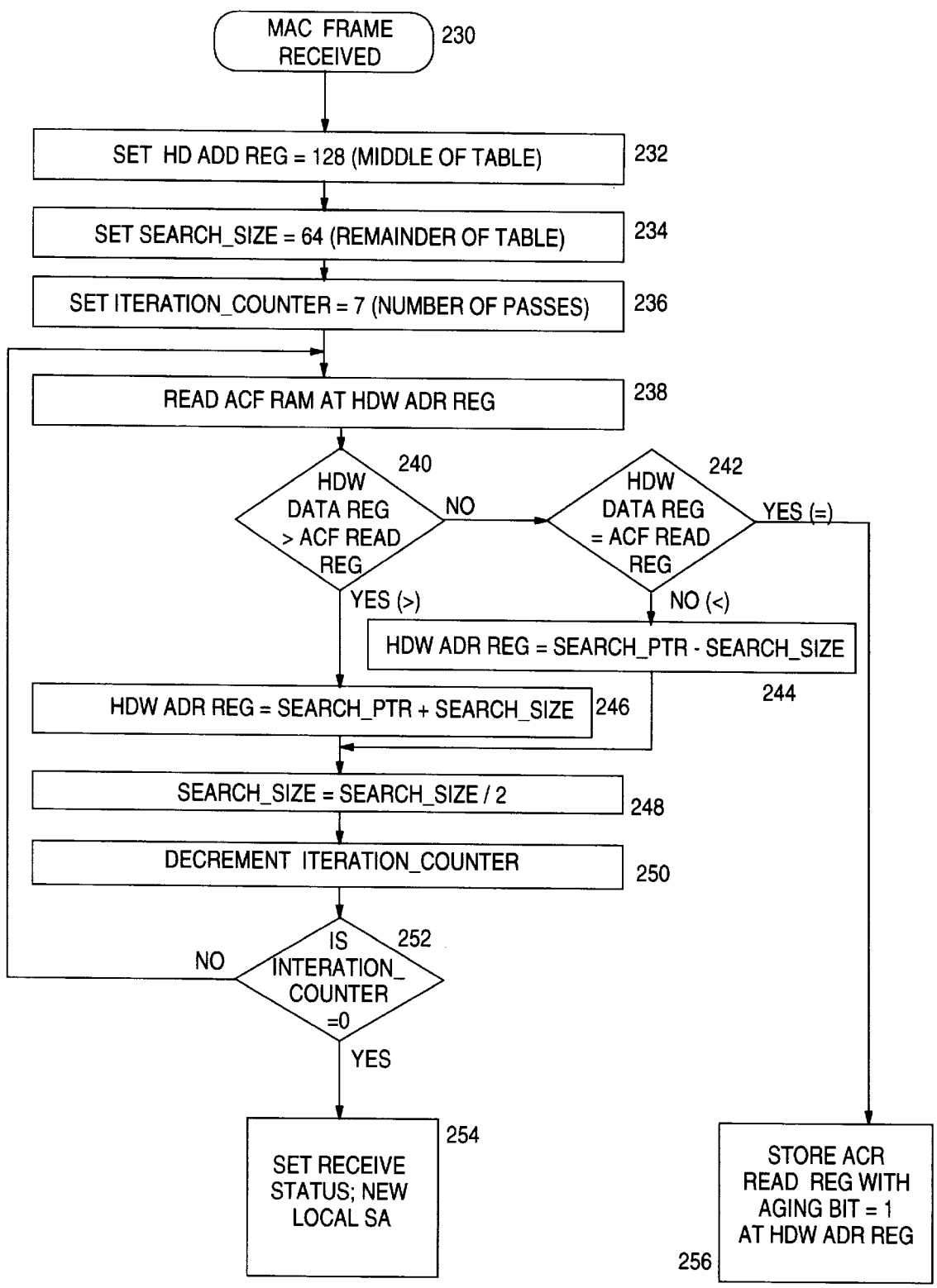
FIG. 8 shows a flowchart for the algorithm used to search the table for SA of received MAC frames.

FIG. 8 shows a flowchart for a hardware algorithm used to search the ACF RAM to see if the source address of a station received in a MAC frame is in the ACF RAM. As discussed above, the ACF RAM maintains a table of source addresses for active stations connected to the ring which the switch port is connected to. This algorithm also performs a binary search on the ACF RAM and compares selected addresses in the RAM with source address in the MAC frame until a determination is made whether or not the source address is in the ACF RAM. The algorithm includes blocks 230 through 256. In block 230, the switch port involved receives a MAC frame. As to whether or not the frame is a MAC frame is determined by settings (described above) in the FC portion of the frame. The algorithm then descends into block 232 where it sets the value in the hardware address register equal to the mid-point of the possible number of addresses that can be entered in the ACF RAM 40. In the preferred embodiment of the present invention, the ACF RAM 40 can carry a maximum of 256 addresses. Therefore, the Hardware Address Register 41 is set to 128, the middle of the table. The algorithm then descends into block 234. In block 234, the search size is set to 64, the remainder of the entries in the table. The algorithm then descends into block 236, where the number of iterations desired is set in the counter. In the preferred embodiment of this invention, the iterations are set to be 7. The algorithm then descends into block 238 where it reads ACF RAM 40 at the address in the Hardware Address Register 41. The algorithm then descends into block 240 where the address in the Hardware Data Register 34 is compared with the address in the ACF Read Register 46. If it is not greater, the algorithm enters block 242 where it checks to see if the address in the hardware data register is equal to the address read in the ACF Read Register 46. If it is, the address in the ACF Read Register 46 is stored with the aging bit set to 1 at the address in the Hardware Address Register 41 (block 256).

Returning again to block 242, if the address in the Hardware Data Register 34 is not equal to the address in the ACF Read Register 46, the algorithm enters block 244 where the Hardware Address Register 41 is set to the Hardware Address Register 41 value minus the search size and the algorithm descends into block 248 where the search size is set to ½ its current value. Returning to block 240, if the address in the Hardware Data Register 34 is greater than the address in the ACF Read Register 46, the algorithm descends into block 246 where the Hardware Address Register 41 is set to the Hardware Address Register plus the search size and the algorithm descends into block 248. From block 248, the algorithm descends into block 250 where the iteration counter is decremented and the algorithm descends into block 252 where it is checked to see if the iteration count is equal to zero. If it is not, the algorithm loops to block 238 and performs the steps previously described. If the counter is zero, the algorithm descends into block 254 and posts receive status to the microprocessor; a new SA has been detected in the MAC frame. This completes the detailed description of the invention.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. A network switching system including:
   a housing;
   a plurality of ports coupled to said housing;
   a switch fabric operatively positioned within said housing; and
   at least one port processing element interconnecting at least one port to the switch fabric, said at least one port processing element including means for providing frame filtering functions and a device for setting address-recognized bits and frame copied bits (A/C) in selected frames only if destination addresses in said selected frames are not on a port at which the selected frames are received.

2. The network switching system of claim 1 further including a controller coupled to the switch fabric.

3. The network switching system of claim 2 wherein the controller includes a microprocessor.

4. The network switching system of claim 1 wherein the device includes a memory for storing addresses of stations coupled to a port associated with the at least one port processing element;
   an adapter for receiving token ring frames at the at least one port;
   means for correlating addresses in received token ring frames with addresses in the memory; and
   means for setting said A/C bits in token ring frames whose addresses do not match an address in the memory.

5. An apparatus for setting Address-Recognized/Frame-Copied bits at the ports of a switching system interconnecting Local Area Network (LAN) segments including:
   a memory;
   a controller including a first circuit arrangement for generating a table of addresses in said memory;
   second circuit arrangement in said controller for correlating addresses in selective frames received at the port with addresses in the table; and
   third circuit arrangement responsive to signals generated by the second circuit arrangement to set the Address-Recognized/Frame-Copied bits in any frame with an address not matching an address in the memory.

6. The apparatus of claim 5 wherein the controller includes a programmed microprocessor.

7. The apparatus of claim 5 further including a fourth circuit arrangement for maintaining the table of addresses.

8. An apparatus for setting Address-Recognized/Frame-Copied bits at the ports of a switching system interconnecting Local Area Network (LAN) segments including:
   a memory;
   a controller including a first circuit arrangement for generating a table of addresses in said memory;
   second circuit arrangement in said controller for correlating addresses in selective frames received at the port with addresses in the table; and
   third circuit arrangement responsive to signals generated by the second circuit arrangement to set the Address-Recognized/Frame-Copied bits in any frame with an address not matching an address in the memory;
   a fourth circuit arrangement for establishing and maintaining the table of addresses wherein the circuit arrangement for maintaining the table of addresses further includes means for arranging the addresses in ascending numerical order; and
   means for selectively deleting an address entry from said tables.

9. An apparatus for setting Address-Recognized/Frame-Copied bits at the ports of a switching system interconnecting Local Area Network (LAN) segments including:
   a memory;
   a controller including a first circuit arrangement that extract source addresses from nearest Neighbor Notification MAC frames to generate a table of addresses in said memory;

second circuit arrangement in said controller for correlating addresses in selective frames received at the port with addresses in the table; and third circuit arrangement responsive to signals generated by the second circuit arrangement to set the Address-Recognized/Frame-Copied bits in any frame with an address not matching an address in the memory.

10. The apparatus of claim 9 wherein the second circuit arrangement correlates destination addresses in Logical Link Control frames with the source addresses.

11. In a computer network including a network switching system having at least two ports, at least two LAN segments one of each connected to one of the at least two ports and a plurality of stations connected to each LAN segment a method for operating the ports comprising the steps of:

a) generating a table containing addresses of active stations coupled to the ports;
   b) monitoring communications at the port to detect a particular type of frame;
   c) for each frame of the particular type of frames detected, extracting an address;
   d) correlating the address in step (c) with addresses in the table; and
   e) setting selected bits in each of the frames detected in step (c) if the addresses do not match an address in the table.

12. The method of claim 11 wherein the particular type of frame includes Logical Link Control frames.

13. The method of claim 11 wherein the correlating step includes comparing the address in the frame with addresses in the table.

14. The method of claim 11 wherein the addresses in the table are Source Addresses (SA) that are extracted from MAC frames.

15. In a computer network including a network switching system having at least two ports, at least two LAN segments one of each connected to one of the at least two ports and a plurality of stations connected to each LAN segment a method for operating the ports comprising the steps of:

a) generating a table containing Source addresses of active stations coupled to the ports wherein said Source addresses are extracted from MAC frames collected during a Neighbor Notification cycle;
   b) monitoring communications at the port to detect a particular type of frame;
   c) for each frame of the particular type of frames detected, extracting an address;
   d) correlating the address in step (c) with addresses in the table; and
   e) setting selected bits in each of the frames detected in step (c) if the addresses do not match an address in the table.

16. The method of claim 14 wherein the particular type of frame includes Logical Link Control frames and the address includes destination address.

17. In a computer network including a network switching system having at least two ports, at least two LAN segments one of each connected to one of the at least two ports and a plurality of stations connected to each LAN segment a method for operating the ports comprising the steps of:

a) generating a table containing Source addresses arranged in ascending numerical order and extracted from MAC frames of active stations coupled to the ports;
   b) monitoring communications at the port to detect Logical Link Control frame;
   c) for each Logical Link Control frame detected, extracting a destination address;
   d) correlating the address in step (c) with addresses in the table; and
   e) setting selected bits in each of the frames detected in step (c) if the addresses do not match an address in the table.

18. A method comprising:

a) receiving in at least one port of a network device a frame having at least a Source Address, Destination Address, Address-Recognized/Address-Copied bits;
   b) determining if the Source Address and the Destination Address are attached to the at least one port;
   c) setting the Address-Recognized/Address-Copied bits in a first state different from the state in which the bits were received if the Destination Address is not attached to the at least one port;
   d) forwarding the frame with the bits set to the first state; and
   e) forwarding the frame with the Address-Recognized/Address-Copied bits in the same state as they were received, if the Destination Address and Source Address are attached to the at least one port.

19. The method of claim 18 further including the steps of generating a database including addresses of stations on a port segment of the at least one port; and as selected frames on the port segment enters the at least one port, comparing Destination Addresses in the selected frames with entries in the database.

* * * * *